(12) United States Patent
Fukumoto

(10) Patent No.: US 9,746,892 B2
(45) Date of Patent: Aug. 29, 2017

(54) SWITCHING POWER SOURCE APPARATUS

(71) Applicant: Rohm Co., Ltd., Kyoto (JP)

(72) Inventor: Yosuke Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/969,072

(22) Filed: Dec. 15, 2015

(65) Prior Publication Data
US 2016/0172978 A1 Jun. 16, 2016

(30) Foreign Application Priority Data

Dec. 16, 2014 (JP) ................................. 2014-254205

(51) Int. Cl.
H02M 3/158 (2006.01)
G06F 1/26 (2006.01)
H02M 3/156 (2006.01)

(52) U.S. Cl.
CPC ................ G06F 1/263 (2013.01); G06F 1/26 (2013.01); H02M 3/156 (2013.01)

(58) Field of Classification Search
CPC ............................... H02M 3/158; G06F 1/263
See application file for complete search history.

(56) References Cited

U.S. PATENT DOCUMENTS

| 7,880,454 | B2 * | 2/2011 | Latham, II | .......... | H02M 3/1588 |
| | | | | | 323/284 |
| 8,319,482 | B2 * | 11/2012 | Matsuo | ............... | H02M 3/1588 |
| | | | | | 323/224 |
| 8,482,267 | B2 * | 7/2013 | Noda | .................... | H02M 3/158 |
| | | | | | 323/282 |
| 2011/0133711 | A1 | 6/2011 | Murakami et al. | | |
| 2014/0036556 | A1 | 2/2014 | Murakami et al. | | |

FOREIGN PATENT DOCUMENTS

JP 2011-142795 7/2011

* cited by examiner

*Primary Examiner* — Emily P Pham
(74) *Attorney, Agent, or Firm* — Fish & Richardson P.C.

(57) ABSTRACT

A switching power source apparatus includes: a switching output circuit that generates an output voltage from an input voltage; an error amplifier that generates an error voltage in accordance with a difference between a predetermined reference voltage and the output voltage or a feedback voltage corresponding to the output voltage; a clock signal generation circuit that generates a clock signal; a slope voltage generation circuit that receives the clock signal to generate a slope voltage; a delay circuit that delays the clock signal to generate an on-signal; a PWM comparator that compares the error voltage and the slope voltage with each other to generate an off-signal; a logic circuit that receives the on-signal and off-signal to generate a pulse width modulation signal; and a switch drive circuit that receives the pulse width modulation signal to generate a drive signal for the switching output circuit.

9 Claims, 9 Drawing Sheets

SWITCHING POWER SOURCE APPARATUS

CROSS-REFERENCE TO RELATED APPLICATIONS

This application is based on the following Japanese Patent Application, the contents of which are hereby incorporated by reference:

(1) Patent Application No.: 2014-254205 (the filing date: Dec. 16, 2014)

BACKGROUND OF THE INVENTION

1. Field of the Invention

The present invention relates to a switching power source apparatus.

2. Description of Related Art

Conventionally, as power sources for various applications, switching power source apparatuses of PWM [pulse width modulation] drive type are widely used.

The switching power source apparatus of PWM drive type has generally, as circuit elements forming its voltage feedback loop, an error amplifier that generates an error voltage in accordance with a difference between an output voltage or a feedback voltage corresponding to the output voltage and a predetermined reference voltage; a slope voltage generation circuit that generates a slope voltage; and a PWM comparator that compares the error voltage and the slope voltage with each other to decide an off-timing of an output transistor.

In the meantime, as an example of the prior art relevant to the above description, there is JP-A-2011-142795.

However, in the conventional switching power source apparatus, there are problems that a higher switching frequency leads to a severer duty restriction because of an internal delay of the PWM comparator and it becomes unable to decrease the output voltage.

SUMMARY OF THE INVENTION

In light of the above problems found by the inventor of the present application, it is an object of the invention disclosed in the present specification to provide a switching power source apparatus that is able to eliminate a duty restriction caused by an internal delay of a PWM comparator.

A switching power source apparatus disclosed in the present specification includes: a switching output circuit that generates an output voltage from an input voltage; an error amplifier that generates an error voltage in accordance with a difference between a predetermined reference voltage and the output voltage or a feedback voltage corresponding to the output voltage or a feedback voltage corresponding to the output voltage or a predetermined reference voltage; a clock signal generation circuit that generates a clock signal; a slope voltage generation circuit that receives an input of the clock signal to generate a slope voltage; a delay circuit that delays the clock signal to generate an on-signal; a PWM [pulse width modulation] comparator that compares the error voltage and the slope voltage with each other to generate an off-signal; a logic circuit that receives inputs of the on-signal and off-signal to generate a pulse width modulation signal; and a switch drive circuit that receives an input of the pulse width modulation signal to generate a drive signal for the switching output circuit.

In the meantime, other features, elements, steps, advantages, and characteristics of the present invention will become more apparent from the following detailed description of the best embodiments and the attached drawings.

DETAILED DESCRIPTION OF PREFERRED EMBODIMENTS

<Switching Power Source Apparatus>

Figure 1:
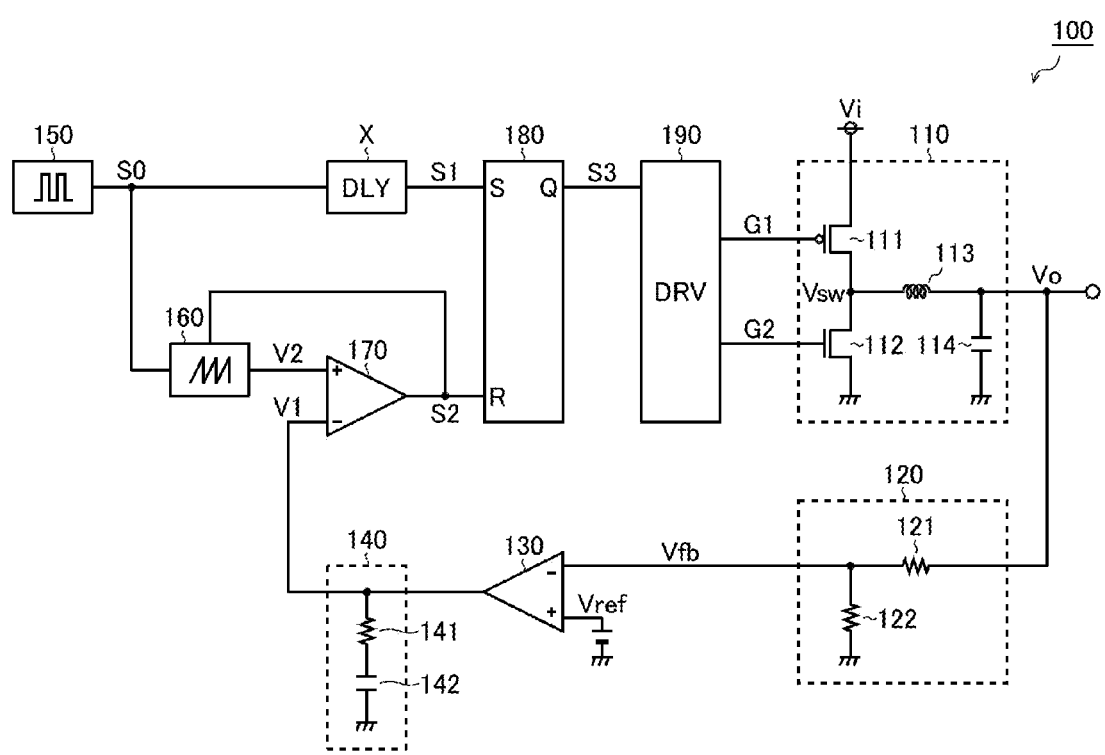
FIG. 1 is a block diagram showing a structural example of a switching power source apparatus.

FIG. 1 is a block diagram showing a structural example of a switching power source apparatus. A switching power source apparatus 100 of the present structural example is a DC/DC converter of PWM drive type that generates a desired output voltage Vo from an input voltage Vi and supplies the output voltage Vo to not-shown loads (CPU [central processing unit] and the like), and has: a switching output circuit 110, a feedback voltage generation circuit 120, an error amplifier 130, a phase compensation filter 140, a clock signal generation circuit 150, a slope voltage generation circuit 160, a PWM comparator 170, a logic circuit 180, a switch drive circuit 190, and a delay circuit X. In the meantime, besides the above circuit elements, other protection circuits (low input faulty operation prevention circuit, temperature protection circuit and the like) may be suitably built in the switching power source apparatus 100.

The switching output circuit 110 is a switching output stage of stepping-down type that steps down the input voltage Vi to generate the desired output voltage Vo and includes an output transistor 111, a synchronization rectification transistor 112, an output inductor 113, and an output capacitor 114.

The output transistor 111 is a PMOSFET [P channel type metal oxide semiconductor field effect transistor] that functions as an upper side switch of the switching output stage. A source of the output transistor 111 is connected to an application terminal for the input voltage Vi. A drain of the output transistor 111 is connected to a first terminal of the output inductor 113. A gate of the output transistor 111 is connected to an application terminal for an upper side gate signal G1. The output transistor 111 is turned off when the upper side gate signal G1 is at a high level, and is turned on when the upper side gate signal G1 is at a low level.

The synchronization rectification transistor 112 is an NMOSFET [N channel type MOSFET] that functions as a lower side switch of the switching output stage. A source of the synchronization rectification transistor 112 is connected to a ground terminal (application terminal for a ground voltage GND). A drain of the synchronization rectification transistor 112 is connected to the first terminal of the output inductor 113. A gate of the synchronization rectification transistor 112 is connected to an application terminal for a lower side gate signal G2. The synchronization rectification transistor 112 is turned on when the lower side gate signal G2 is at a high level, and is turned off when the lower side gate signal G2 is at a low level.

The output transistor 111 and the synchronization rectification transistor 112 are turned on/off complementarily in accordance with the upper side gate signal G1 and the lower side gate signal G2. Such on/off operation generates a switch voltage Vsw, which undergoes pulse driving between the input voltage Vi and the ground voltage GND and has a rectangular waveform, at the first terminal of the output inductor 113. In the meantime, the above language "complementarily" covers not only a case where the on/off states of the output transistor 111 and synchronization rectification transistor 112 are completely reverse to each other but also a case where a concurrent off-period (dead time) of both transistors is disposed.

The output inductor 113 and the output capacitor 114 form an LC filter that rectifies or smooths the switch voltage Vsw to generate the output voltage Vo. The first terminal of the output inductor 113 is connected to an application terminal for the switch voltage Vsw. Both a second terminal of the output inductor 113 and a first terminal of the output capacitor 114 are connected to an application terminal for the output voltage Vo. A second terminal of the output capacitor 114 is connected to a ground terminal.

In the meantime, the output type of the switching output circuit 110 is not limited to the above stepping-down type, but may be any one of a stepping-up type, a stepping-up/down type, and an inverting type. Besides, the rectification type of the switching output circuit 110 is not limited to the above synchronization rectification type, but a diode rectification type, which uses a rectification diode in place of the synchronization rectification transistor 112, may be employed.

Besides, in a case where a high voltage is applied to the switching output circuit 110, high voltage withstand devices such as a power MOSFET, an IGBT [insulated gate bipolar transistor], a SiC transistor and the like may be used as the output transistor 111 and the synchronization rectification transistor 112.

The feedback voltage generation circuit 120 includes resistors 121 and 122 that are connected in series between the application terminal for the output voltage Vo and the ground terminal, and outputs a feedback voltage Vfb (divided voltage of the output voltage Vo) from a connection node between both resistors in accordance with the output voltage Vo. In the meantime, in a case where the output voltage Vo stays in an input dynamic range of the error amplifier 130, the output voltage Vo may be directly input into the error amplifier 130 without using the feedback voltage generation circuit 120.

The error amplifier 130 generates an error voltage V1 in accordance with a difference between the feedback voltage Vfb applied to an inverting input terminal (−) and a reference voltage Vref applied to a non-inverting input terminal (+). The error voltage V1 rises when the feedback voltage Vfb is lower than the reference voltage Vref, and declines when the feedback voltage Vfb is higher than the reference voltage Vref.

The phase compensation filter 140 includes a resistor 141 and a capacitor 142 that are connected in series between an application terminal for the error voltage V1 and the ground terminal, and compensates a phase of the error voltage V1 to prevent oscillation of the error amplifier 130.

The clock signal generation circuit 150 generates a clock signal S0 that undergoes pulse driving at a predetermined switching frequency fsw (=1/T).

The slope voltage generation circuit 160 receives inputs of the clock signal S0 and off-signal S2 to generate a slope voltage V2 that has a triangular waveform, a serrated waveform, or an n-degree-slope waveform (e.g., n=2). The slope voltage V2 starts to rise by using a falling edge of the clock signal S0 as a trigger, and is reset to a zero value by using a rising edge of the off-signal S2 as a trigger.

The PWM comparator 170 compares the error voltage V1 applied to an inverting input terminal (−) and the slope voltage V2 applied to a non-inverting input terminal (+) to generate the off-signal S2. The off-signal S2 goes to a low level when the slope voltage V2 is lower than the error voltage V1, and goes to a high level when the slope voltage V2 is higher than the error voltage V1.

The logic circuit 180 is an RS flip flop that generates a pulse width modulation signal S3 (hereinafter, called a PWM signal S3) in accordance with an on-signal S1 input into a set terminal (S) and the off-signal S2 input into a reset terminal (R). The PWM signal S3 is set to a high level at a falling edge of the on-signal S1 and reset to a low level at a rising edge of the off-signal S2.

The switch drive circuit 190 receives an input of the PWM signal S3 to generate the upper side gate signal G1 and the lower side gate signal G2 (which correspond to drive signals for the switching output circuit 110). The upper side gate signal G1 and the lower side gate signal G2 basically go to the low level when the PWM signal S3 is at the high level and go to the high level when the PWM signal S3 is at the low level.

The delay circuit X delays the clock signal S0 to generate the on-signal S1. Describing more specifically, the delay circuit X gives a delay TdB, which is identical or equal to an internal delay TdA of the PWM comparator 170, to the clock signal S0 to generate the on-signal S1.

<Pulse Width Modulation Control>

Hereinafter, to clarify the significance of introducing the delay circuit X, first, pulse width modulation control in a case (case where the clock signal S0 as the on-signal S1 is directly input into the logic circuit 18), where the delay circuit X is not introduced, is described with reference to FIG. 2 to FIG. 4, and next, pulse width modulation control in a case, where the delay circuit X is introduced, is described with reference to FIG. 5.

Figure 2:
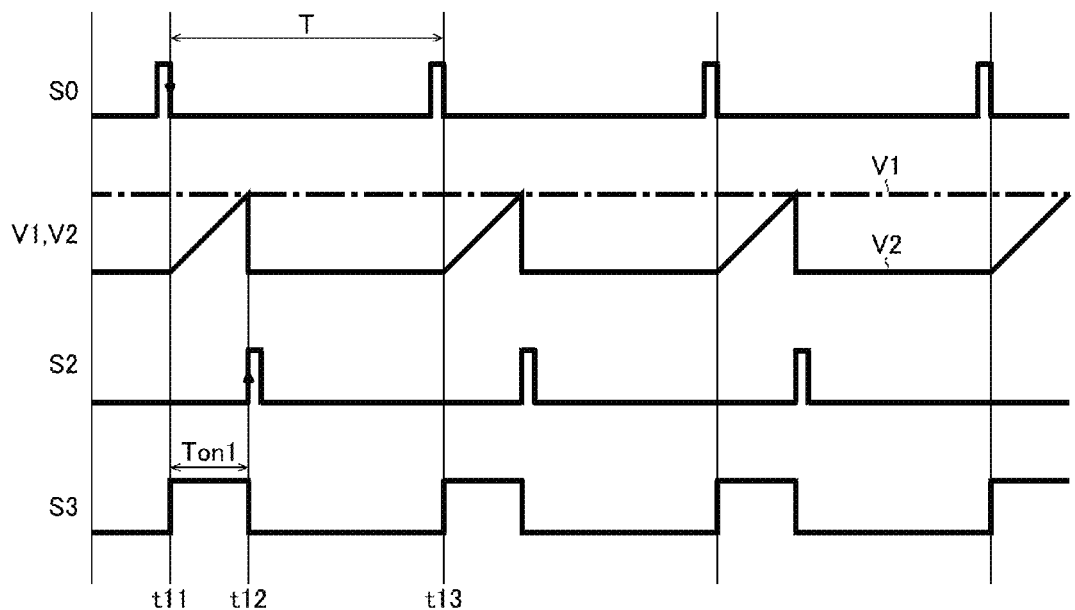
FIG. 2 is a timing chart showing a first example of pulse width modulation control.

FIG. 2 is a timing chart showing a first example of the pulse width modulation control, and illustrates, from top in order, the clock signal S0 (=on-signal S1), the error voltage V1, the slope voltage V2, the off-signal S2, and the PWM signal S3. In the meantime, the first example of the present figure illustrates behavior in an ideal state in which the PWM comparator 170 has no internal delay TdA and it is not necessary to introduce the delay circuit X.

At a time point t11, if the clock signal S0 is dropped to a low level, the PWM signal S3 is set to the high level. As a result of this, the output transistor 111 of the switching output circuit 110 is turned on, and the synchronization rectification transistor 112 is turned off. Besides, at the time point t11, if the clock signal S0 is dripped to the low level, the slope voltage V2 starts to rise with a predetermined inclination.

At a time point t12, if the slope voltage V2 becomes higher than the error voltage V1 and the off-signal S2 is raised to the high level with no delay, the PWM signal S3 is reset to the low level. As a result of this, the output transistor 111 of the switching output circuit 110 is turned off, and the synchronization rectification transistor 112 is turned on. Besides, at the time point t12, if the off-signal S2 is raised to the high level, the slope voltage V2 is quickly discharged.

According to the above pulse width modulation control, a high level period Ton1 (on-period of the output transistor 111) of the PWM signal S3 becomes longer as the error voltage V1 becomes higher, and becomes shorter as the error voltage V1 becomes lower. In other words, a duty D (=Ton1/T) of the PWM signal S3 becomes larger as the error voltage V1 becomes higher, and becomes smaller as the error voltage V1 becomes lower.

In the meantime, even after a time point t13 when the clock signal S0 is raised again to the high level, the same pulse width modulation control as the above one is repeated, whereby the output transistor 111 of the switching output circuit 110 and the synchronization rectification transistor 112 are periodically turned on/off and the desired output voltage Vo is generated.

Figure 3:
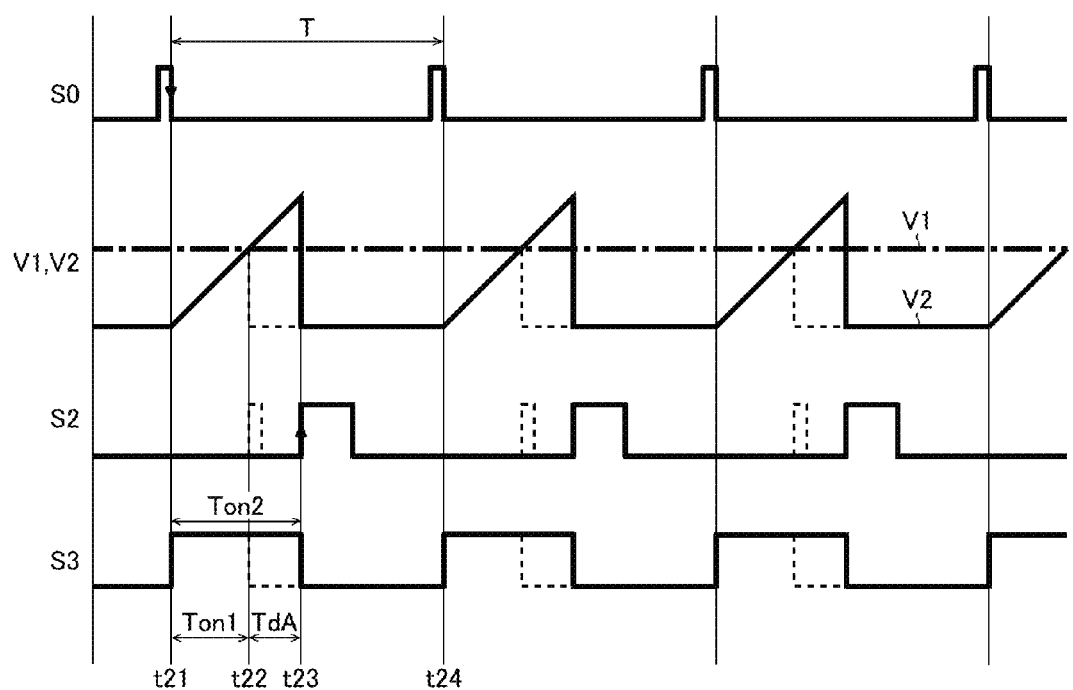
FIG. 3 is a timing chart showing a second example of pulse width modulation control.

FIG. 3 is a timing chart showing a second example of the pulse width modulation control, and like FIG. 2 described above, illustrates, from top in order, the clock signal S0 (=on-signal S1), the error voltage V1, the slope voltage V2, the off-signal S2, and the PWM signal S3. In the meantime, the second example of the present figure illustrates behavior in the case where the delay circuit X is not introduced in a non-ideal state in which the internal delay TdA resides in the PWM comparator 170.

At a time point t21, if the clock signal S0 is dropped to the low level, the PWM signal S3 is set to the high level. As a result of this, the output transistor 111 of the switching output circuit 110 is turned on, and the synchronization rectification transistor 112 is turned off. Besides, at the time point t21, if the clock signal S0 is dripped to the low level, the slope voltage V2 starts to rise with a predetermined inclination. This is quite the same as the above first example (FIG. 2).

At a time point t22, when the slope voltage V2 becomes higher than the error voltage V1, if there is not the internal delay TdA in the PWM comparator 170, the off-signal S2 rises to the high level with no delay and the PWM signal S3 is reset to the low level (see broken line). However, as a matter of fact, the PWM comparator 170 has the internal delay TdA. Accordingly, at the time point t22, the off-signal S2 does not rise to the high level, and the high level period of the PWM signal S3 continues.

At a time point t23, if the internal delay TdA of the PWM comparator 170 elapses, the off-signal S2 rises to the high level at last, and the PWM signal S3 is reset to the low level. As a result of this, the output transistor 111 of the switching output circuit 110 is turned off, and the synchronization rectification transistor 112 is turned on. Besides, at the time point t23, if the off-signal S2 is raised to the high level, the slope voltage V2 is quickly discharged.

In the meantime, even after a time point t24 when the clock signal S0 is raised again to the high level, the same pulse width modulation control as the above one is repeated.

As described above, in the case where the internal delay TdA resides in the PWM comparator 170, compared with the high level period Ton1 in the case where the internal delay TdA does not reside, a high level period Ton2 of the PWM signal S3 becomes longer by the internal delay TdA (Ton2=Ton1+TdA). Accordingly, the duty D (=Ton2/T) of the PWM signal S3 becomes larger than the original. Therefore, the output voltage Vo becomes higher than the desired value.

Figure 4:
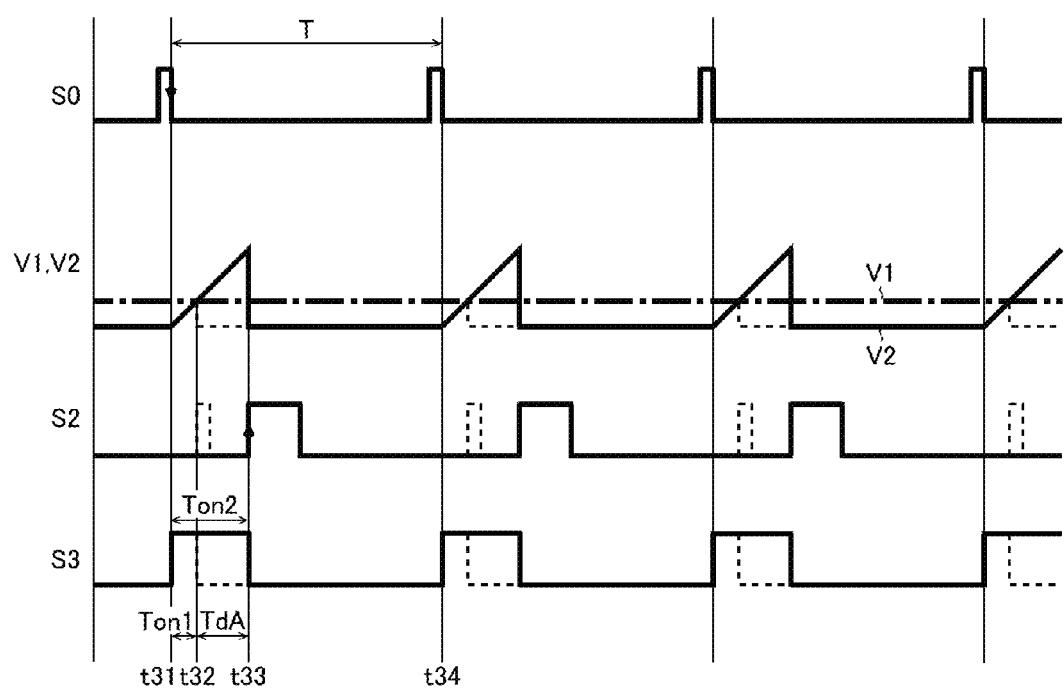
FIG. 4 is a timing chart showing a third example of pulse width modulation control.

FIG. 4 is a timing chart showing a third example of the pulse width modulation control, and like FIG. 2 and FIG. 3 described above, illustrates, from top in order, the clock signal S0 (=on-signal S1), the error voltage V1, the slope voltage V2, the off-signal S2, and the PWM signal S3. In the meantime, the third example of the present figure illustrates behavior in the case where the delay circuit X is not introduced in the non-ideal state in which the internal delay TdA resides in the PWM comparator 170 and the error voltage V1 becomes lower than the above second example.

Behavior from a time point t31 to a time point t34 is basically the same as the behavior from the time point t21 to the time point t24 (see FIG. 3). In other words, in the case where the internal delay TdA resides in the PWM comparator 170, compared with the high level period Ton1 in the case where the internal delay TdA does not reside, the high level period Ton2 of the PWM signal S3 becomes longer by the internal delay TdA, and the duty D of the PWM signal S3 becomes larger than the original.

In the meantime, as the error voltage V1 becomes lower, the cross timing between the error voltage V1 and the slope voltage V2 becomes earlier. Accordingly, the high level period Ton2 becomes shorter. However, the internal delay TdA of the PWM comparator 170 is always constant. Accordingly, no matter how earlier the cross timing between the error voltage V1 and the slope voltage V2 becomes, the high level period Ton2 never become shorter than the internal delay TdA. In other words, as long as the internal delay TdA resides, the minimum value of the duty D is restricted by the internal delay TdA. Accordingly, it becomes impossible to drop the output voltage Vo.

Especially, in a case where the switching frequency fsw of the clock signal S0 is raised, a period T becomes short, and the high level period Ton2 for adjusting the output voltage Vo to the desired value becomes short. Accordingly, the above problem appears.

Figure 5:
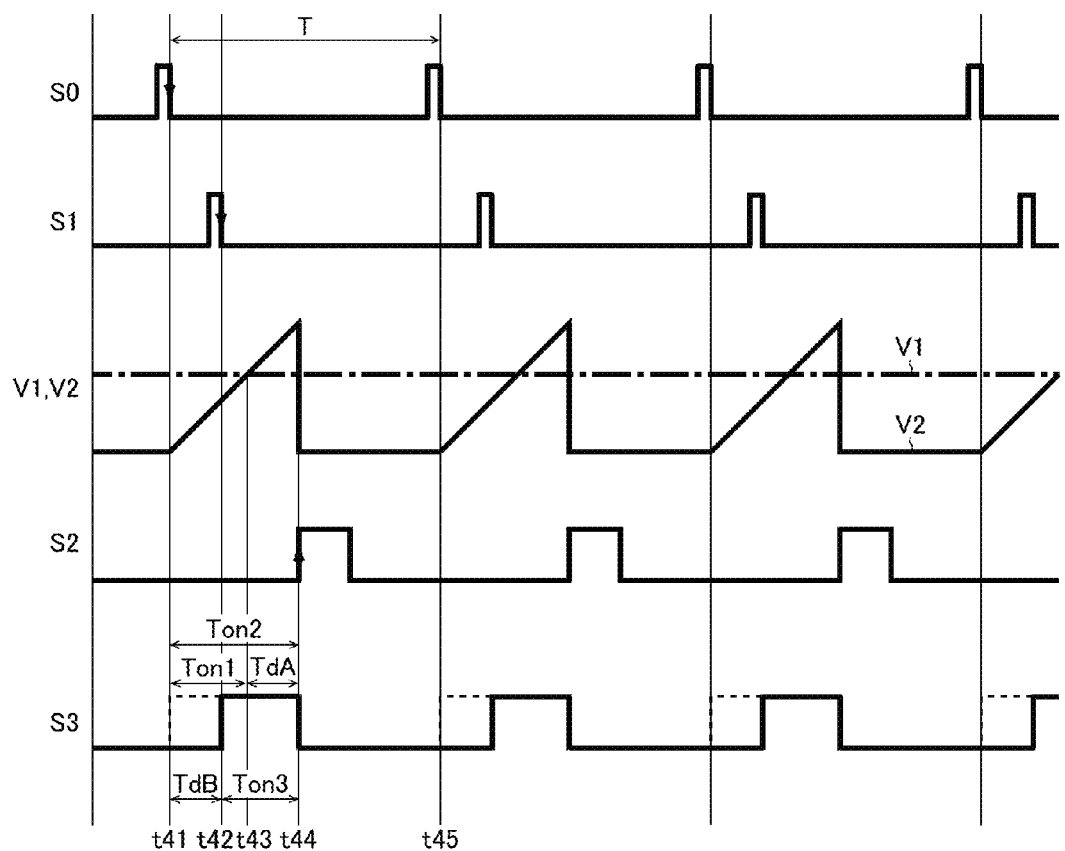
FIG. 5 is a timing chart showing a fourth example of pulse width modulation control.

FIG. 5 is a timing chart showing a fourth example of the pulse width modulation control, and illustrates, from top in order, the clock signal S0, the on-signal S1, the error voltage V1, the slope voltage V2, the off-signal S2, and the PWM signal S3. In the meantime, the fourth example of the present figure illustrates behavior in the case where the delay circuit X is introduced in the non-ideal state in which the internal delay TdA resides in the PWM comparator 170.

At a time point t21, if the clock signal S0 is dropped to the low level, the slope voltage V2 starts to rise with a predetermined inclination. On the other hand, the on-signal S1, which gives the delay TdB to the clock signal S0, has not been dropped to a low level yet. Accordingly, the PWM signal S3 is kept at the low level (see broken line).

At a time point t42, if the on-signal S1 is dropped to the low level, the PWM signal S3 is set to the high level. As a result of this, the output transistor 111 of the switching output circuit 110 is turned on, and the synchronization rectification transistor 112 is turned off.

At a time point t43, the slope voltage V2 is higher than the error voltage V1, but because there is the internal delay TdA in the PWM comparator 170, the off-signal S2 does not rise to the high level, and the high level period of the PWM signal S3 continues.

At a time point t44, if the internal delay TdA of the PWM comparator 170 elapses, the off-signal S2 rises to the high level at last, and the PWM signal S3 is reset to the low level. As a result of this, the output transistor 111 of the switching output circuit 110 is turned off, and the synchronization rectification transistor 112 is turned on. Besides, at the time point t44, if the off-signal S2 is raised to the high level, the slope voltage V2 is quickly discharged.

In the meantime, even after a time point t45 when the clock signal S0 is raised again to the high level, the same pulse width modulation control as the above one is repeated.

As described above, according to the introduction of the delay circuit X, compared with the above second example (FIG. 3) and third example (FIG. 4), a rising timing of the PWM signal S3 delays by the delay TdB. In other words, a high level period Ton3 of the PWM signal S3 becomes a length (=Ton1+TdA−TdB) obtained by subtracting the delay TdB from the high level period Ton2 (=Ton1+TdA) during the non-introduction time of the delay circuit X.

Accordingly, it is possible to cancel the internal delay TdA by means of the delay TdB. Therefore, it becomes possible to eliminate a duty restriction caused by the internal delay TdA and drop the output voltage Vo.

<Delay Circuit>

Figure 6:
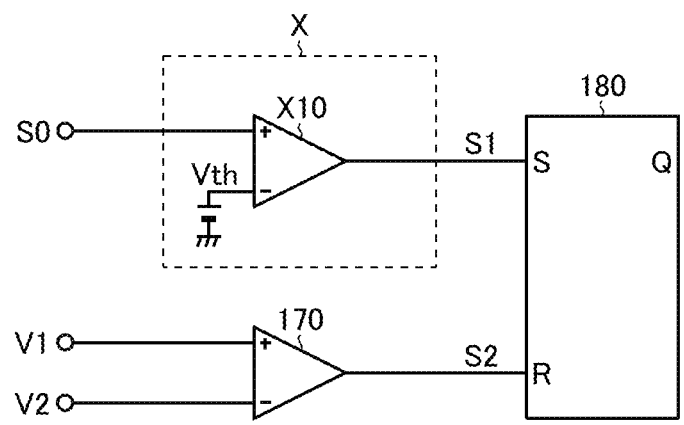
FIG. 6 is a view showing a first structural example of a delay circuit X.

FIG. 6 is a view showing a first structural example of the delay circuit X. The delay circuit X of the present structural example includes a comparator X10. The comparator X10 compares the clock signal S0 input into a non-inverting input terminal (+) and a predetermined threshold voltage Vth input into an inverting input terminal (−) to generate the on-signal S1. The on-signal S1 goes to the high level when the clock signal S0 is higher than the threshold voltage Vth, and goes to the low level when the clock signal S0 is lower than the threshold voltage Vth.

Here, the comparator X10 is formed to have pairability with the PWM comparator 170. Accordingly, the internal delay TdB of the comparator X10 becomes identical or equal to the internal delay TdA of the PWM comparator 170. As a result of this, it is possible to suitably cancel out the internal delay TdA by means of the internal delay TdB. Accordingly, it becomes possible to adjust the high level period Ton3 (see FIG. 5) of the PWM signal S3 to the high level period Ton1 (see FIG. 1) in the ideal state.

Figure 7:
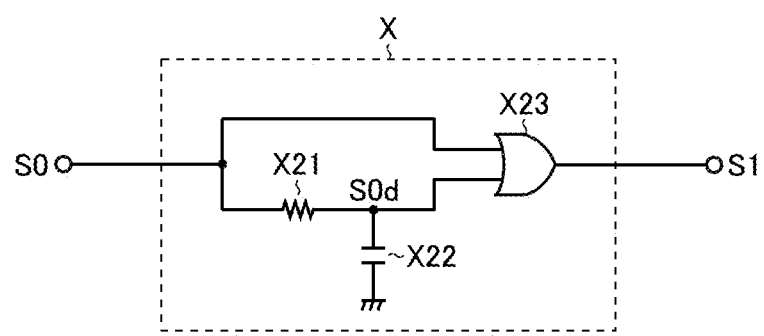
FIG. 7 is a view showing a second structural example of the delay circuit X.

FIG. 7 is a view showing a second structural example of the delay circuit X. The delay circuit X of the present structural example includes a resistor X21, a capacitor X22, and an OR gate X23.

The resistor X21 and the capacitor X22 function in pairs as an RC filter that makes the clock signal S0 blunt at a time constant τ to generate a delay clock signal S0d.

The OR gate X23 performs a logic sum calculation of the clock signal S0 and the delay clock signal S0d to generate the on-signal S1. The on-signal S1 goes to the high level when either one of the clock signal S0 and the delay clock signal S0d is at the high level, and goes to the low level when both the clock signal S0 and the delay clock signal S0d are at the low level.

Figure 8:
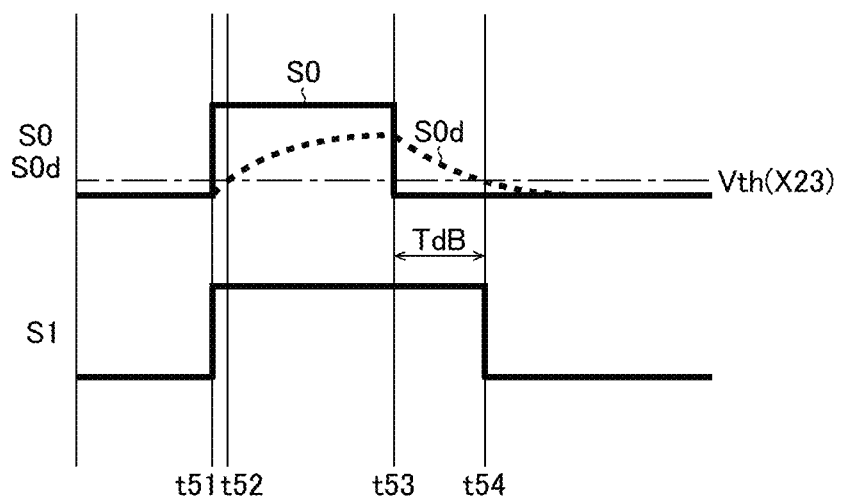
FIG. 8 is a timing chart showing an example of a clock delay operation.

FIG. 8 is a timing chart showing an example of the clock delay operation, and illustrates, from top in order, the clock signal S0 (solid line), the delay clock signal S0d, and the on-signal S1.

At a time point t51, if the clock signal S0 is raised to the high level, the delay clock signal S0d starts to rise slowly at the predetermined time constant τ. In the meantime, during a duration when the delay clock signal S0d is lower than the threshold voltage Vth (X23) of the OR gate X23, it is recognized in the OR gate X23 that the delay clock signal S0d is at the low level. However, the clock signal S0 stays at the high level. Accordingly, also the on-signal S1 rises to the high level with no delay.

At a time point t52, if the delay clock signal S0d becomes higher than the threshold voltage Vth (X23), it is recognized in the OR gate X23 that the delay clock signal S0d is at the high level. At this time point, both the clock signal S0 and the delay clock signal S0d go to the high level. Accordingly, the on-signal S1 is kept at the high level.

At a time point t53, if the clock signal S0 is dropped to the low level, the delay clock signal S0d starts to decline slowly at the predetermined time constant τ. In the meantime, during a duration when the delay clock signal S0d is higher than the threshold voltage Vth (X23), it is recognized in the OR gate X23 that the delay clock signal S0d is at the high level. Accordingly, even after the clock signal S0 is dropped to the low level, the on-signal S1 is kept at the high level.

At a time point t54, if the delay clock signal S0d becomes lower than the threshold voltage Vth (X23), it is recognized in the OR gate X23 that the delay clock signal S0d is at the low level. At this time point, both the clock signal S0 and the delay clock signal S0d go to the low level. Accordingly, the on-signal S1 falls to the low level.

In other words, the delay TdB is given in accordance with the time constant τ of the RC filter from the time the clock signal S0 is dropped to the low level at the time point t53 to the time the on-signal S1 is dropped to the low level at the time point t54.

By employing such a structure, compared with the first structural example (FIG. 6) that requires the two comparators (PWM comparator 170 and comparator X10), it becomes possible to reduce a circuit scale of the delay circuit X.

In the meantime, it is desirable that the RC filter (resistor X21 and capacitor X22) includes a trimming function for adjusting its time constant τ. By employing such a structure, it becomes possible to adjust the delay TdB of the delay circuit X to the internal delay TdA of the PWM comparator 170.

Besides, in the second structural example of FIG. 7, the OR gate X23 is used as a logic gate for generating the on-signal S1, but the kind of the logic gate is not limited to this. For example, if it is not necessary to make a rising timing of the clock signal S0 and a rising timing of the on-signal S1 coincide with each other, in place of the OR gate X23, it is also possible to use a Schmidt buffer or the like that receives an input of the delay clock signal S0d to output the on-signal S1.

<Application to Personal Computer>

Figure 9:
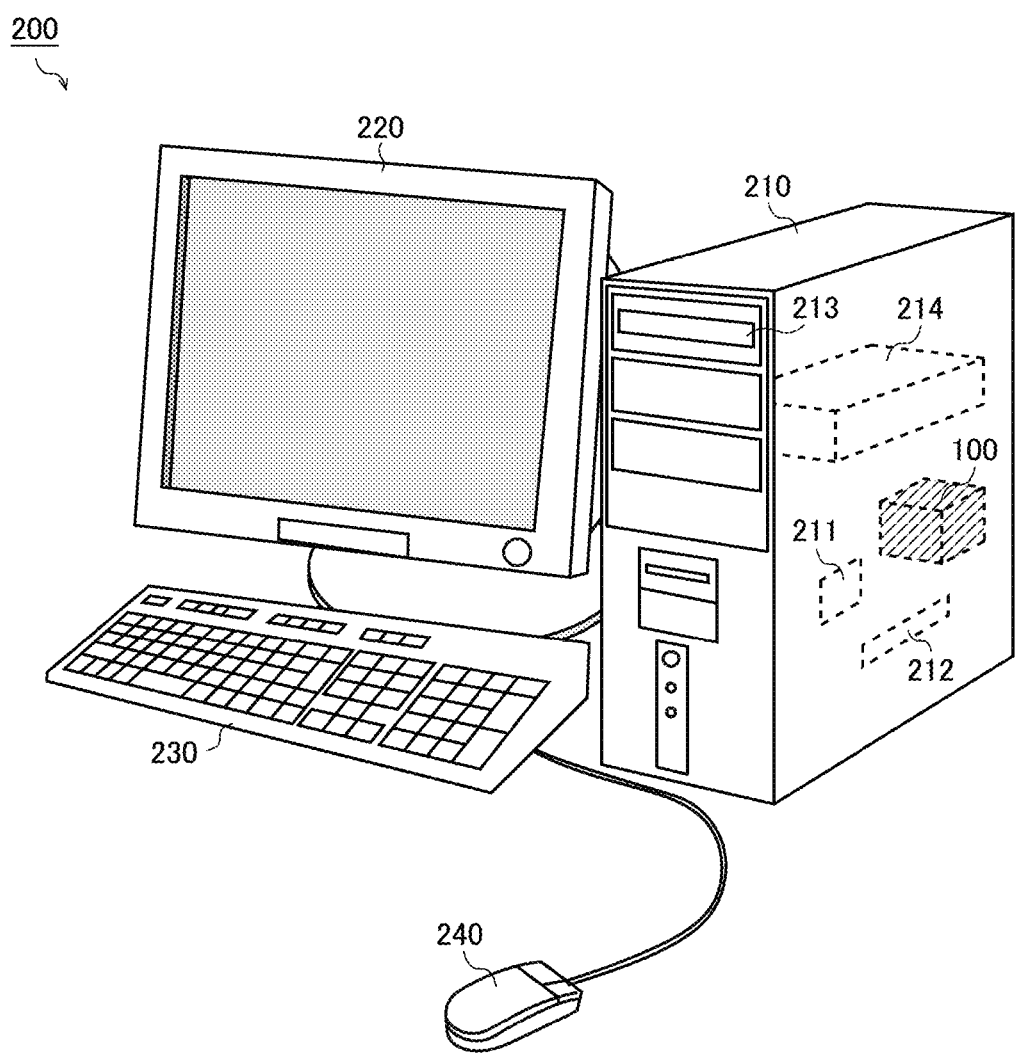
FIG. 9 is an outer appearance view of a desktop personal computer that incorporates a switching power source apparatus.

FIG. 9 is an outer appearance view of a personal computer that incorporates the switching power source apparatus 100. A personal computer 200 of the present structural example has a main body case 210, a liquid crystal monitor 220, a key board 230, and a mouse 240.

The main body case 210 houses a CPU 211, a memory 212, an optical drive 213, a hard disk drive 214, and besides them, the switching power source apparatus 100.

The CPU 211 executes an operating system and various application programs stored in the hard disk drive 214 and thereby comprehensively controls operation of the personal computer 200.

The memory 212 is used as a work area (e.g., area for storing task data when a program is executed) for the CPU 211.

The optical drive 213 performs reading/writing of an optical disc. As the optical disc, there are a CD [compact disc], a DVD [digital versatile disc], a BD [Blu-ray disc] and the like.

The hard disk drive 214 is one of mass auxiliary storages that use a magnetic disc sealed in a housing to store a program and data in a non-volatile manner.

The liquid crystal monitor 220 outputs am image based on an instruction from the CPU 211.

The key board 230 and the mouse 240 are each one of human interface devices that receive an operation by a user.

If the above switching power source apparatus 100 is used as a power source device for the personal computer 200 that has the above structure, the problem of the duty restriction is unlikely to occur even if the switching frequency is increased. Accordingly, for example, even in a case where a load becomes extremely small because of a sleep function of the CPU 211, it becomes possible to keep the output voltage Vo at the desired value.

<Other Modifications>

In the meantime, the various technical features disclosed in the present specification are able to be modified without departing from the spirit of the technical creation besides the above embodiments. In other words, it should be considered that the above embodiments are examples in all respects and are not limiting, and it should be understood that the technical scope of the present invention is not indicated by the above description of the embodiments but by the claims, and all modifications within the scope of the claims and the meaning equivalent to the claims are covered.

<Industrial Applicability>

The invention disclosed in the present specification is applicable to general switching power source apparatuses (e.g., power source for a CPU having a high switching frequency).

What is claimed is:

1. A switching power source apparatus comprising:
    a switching output circuit operable to generate an output voltage from an input voltage,
    an error amplifier operable to generate an error voltage in accordance with a difference between a predetermined reference voltage and the output voltage or a feedback voltage corresponding to the output voltage,
    a clock signal generation circuit operable to generate a clock signal,
    a slope voltage generation circuit operable to receive an input of the clock signal to generate a slope voltage,
    a delay circuit operable to delay the clock signal to generate an on-signal,
    a PWM [pulse width modulation] comparator operable to compare the error voltage and the slope voltage with each other to generate an off-signal,
    a logic circuit operable to receive inputs of the on-signal and off-signal to generate a pulse width modulation signal, and
    a switch drive circuit operable to receive an input of the pulse width modulation signal to generate a drive signal for the switching output circuit, wherein
    the delay circuit gives a delay, which is identical or equal to an internal delay of the PWM comparator, to the clock signal to generate the on-signal.

2. The switching power source apparatus according to claim 1, wherein the delay circuit includes a comparator that has pairability with the PWM comparator, and compares the clock signal and a predetermined threshold voltage with each other to generate the on-signal.

3. The switching power source apparatus according to claim 1, wherein the delay circuit includes:
    a filter that makes the clock signal blunt to generate a delay clock signal, and
    a logic gate that receives an input of the delay clock signal to generate the on-signal.

4. The switching power source apparatus according to claim 3, wherein the filter includes a trimming function for adjusting a time constant of the filter.

5. The switching power source apparatus according to claim 1, further comprising:
    a phase compensation filter that prevents oscillation of the error amplifier.

6. The switching power source apparatus according to claim 1, wherein the logic circuit is an RS flip flop that sets the pulse width modulation signal to a first logic level by using the on-signal as a trigger and resets the pulse width modulation signal to a second logic level by using the off-signal as a trigger.

7. The switching power source apparatus according to claim 1, wherein
    the switching circuit is of stepping-down type, stepping-up type, stepping-up/down type, or inverting type.

8. An electronic apparatus comprising:
    the switching power source apparatus according to claim 1, and
    a load that receives supply of an output voltage from the switching power source apparatus to operate.

9. The electronic apparatus according to claim 8, wherein the load is a central processing unit.

* * * * *